3,113,079
PURIFICATION OF 1,1,1-TRICHLOROETHANE
BY EXTRACTIVE DISTILLATION
Charles R. Bergeron and Andrew O. Wikman, Baton
Rouge, La., assignors to Ethyl Corporation, New York,
N.Y., a corporation of Virginia
No Drawing. Filed Feb. 1, 1961, Ser. No. 86,334
6 Claims. (Cl. 202—39.5)

The present invention relates to the production of 1,1,1-trichloroethane and more particularly to a method of recovering 1,1,1-trichloroethane (methyl chloroform) from mixtures of chlorinated hydrocarbon compounds by extractive distillation.

An outstanding process for the preparation of 1,1,1-trichloroethane, a useful degreasing solvent, is that of thermally chlorinating a mixture of chlorohydrocarbons including primarily ethyl chloride and 1,1-dichloroethane. This unique method permits production of 1,1,1-trichloroethane from a mixed ethyl chloride-1,1-dichloroethane feed stream, the 1,1-dichloroethane being converted to 1,1,1-trichloroethane while simultaneously the ethyl chloride is converted to 1,1-dichloroethane which can be fed with fresh ethyl chloride back into reaction and further chlorinated to 1,1,1-trichloroethane. Because 1,1,1-trichloroethane can be prepared without intense carbon formation and without large amounts and varieties of useless by-products, the process is of immense commercial interest, though nevertheless the process is subject to one severe limitation.

Though the simultaneous chlorination of ethyl chloride and 1,1-dichloroethane to produce 1,1,1-trichloroethane proceeds smoothly, efficiently and without excess carbon formation, a small amount of chlorinated by-products are produced in the reaction. Unfortunately, though the total quantity of these by-products is not very great some of these chlorohydrocarbons cannot be separated from 1,1,1-trichloroethane without the necessity of using an extremely impractical number of distillation columns. The problem of separating 1,1,1-trichloroethane from other chlorohydrocarbons does not arise only because of a closeness of boiling points between the 1,1,1-trichloroethane and the other chlorohydrocarbon compounds from which it is to be separated but also because of a peculiar characteristic of 1,1,1-trichloroethane which causes the separation to become more and more difficult as the relative concentration of the 1,1,1-trichloroethane in the mixture is increased. For example, a very troublesome by-product from which to separate 1,1,1-trichloroethane is 1,2-dichloroethane. Thus, to effect a commercially acceptable separation of 1,1,1-trichloroethane from 1,2-dichloroethane would require on the order of about 150 trays which, as a practical matter, means that several distillation columns must be used. In other words, as a practical matter it is necessary to use four or five distillation columns, or more. This extreme requirement places an extremely heavy burden on the commercial use of the process for co-chlorination of ethyl chloride and 1,1-dichloroethane to manufacture 1,1,1-trichloroethane.

Therefore, it is then among the objects of this invention to provide a method of recovering 1,1,1-trichloroethane by distillation from mixtures of chlorinated hydrocarbons but without the necessity of using an inordinate number of distillation trays. More specifically, it is an object to provide an extractive distillation technique wherein the relative volatility of 1,1,1-trichloroethane contained within a 1,1,1-trichloroethane-chlorinated hydrocarbon mixture is increased by addition to that mixture of an extracting agent. In other words, it is also an object to provide extracting agents which can be supplied to 1,1,1-trichloroethane-chlorohydrocarbon mixtures so that upon subjection of the total mixture to distillation conditions there is evolved a 1,1,1-trichloroethane enriched vapor which can be condensed and recovered. Even more specifically, the present invention provides extracting agents which can be added to 1,1,1-trichloroethane-1,2-dichloroethane mixtures which increase the relative volatility of the 1,1,1-trichloroethane with regard to the 1,2-dichloroethane so that the 1,1,1-trichloroethane can be conveniently separated from the mixture by distillation. Another object of this invention is to provide stabilized 1,1,1-trichloroethane compositions produced by leaving residual amounts of the extracting agents within the 1,1,1-trichloroethane so that the compositions resist deterioration in the presence of metals. Yet another object is to provide a class of extracting agents which are readily separated by distillation from the residual chlorohydrocarbon compounds after removal of the 1,1,1-trichloroethane therefrom. Other objects, as well as many aspects and advantages of the invention will become apparent from the accompanying disclosure.

In accordance with this invention, an extracting agent, as hereinafter defined, is added to a mixture of chlorinated hydrocarbon compounds from which 1,1,1-trichloroethane is to be separated. The total mixture is then heated to boiling to produce a 1,1,1-trichloroethane enriched vapor which is then condensed and recovered. In other words, an extracting agent is added to a mixture of chlorinated hydrocarbon compounds to increase the relative volatility of the 1,1,1-trichloroethane contained therein in relationship to the other chlorohydrocarbons of the mixture so that when the mixture is subjected to distillation an enriched 1,1,1-trichloroethane product is evolved. The evolved product is then condensed and recovered.

The extracting agent which is added to the chlorohydrocarbon mixture is an oxygen-containing organic compound having a melting point of not greater than about 70° C. and a boiling point at atmospheric pressure of at least about 75° C. and being selected from the group of compounds consisting of ethers and phenols. Illustrative of such ethers are allyl methyl ether, butyl ethyl ether, cetyl phenyl ether, isoamyl-2-naphthyl ether, 2-naphthyl propyl ether, and the like. Illustrative of such phenols are m-amino thio phenol, 5-amino-2-nitro phenol, 2,6-dimethoxy phenol, m-ethyl amino phenol, p-heptyloxy phenol, p-octyloxy phenol, m-vinyl phenol, and the like.

A preferred class of ethers are glycolic ethers characterized by containing from 4 to about 16 carbon atoms in the molecule and a preferred class of phenols are characterized by those monohydric phenolic compounds containing up to 3 alkyl substituents having from 1 to about 5 carbon atoms but provided that the total number of carbon atoms in the molecule does not exceed 12. Illustrative of these preferred ethers suitable for the practice of this invention are such cyclic ethers as 2,2-dimethyl-1,4-dioxane, 2-methyl-3-propyl-1,4-dioxane, 2-butyl-4-octyl-1,3-dioxane, 2,2,-di-tert-butyl-1,3-dioxane, 1,3-dioxolane, 2-butyl-4-octyl-1,3-dioxolane; and such acyclic ethers as diethylene glycol monopropyl ether, diethylene glycol dipropyl ether, diethylene glycol methylethyl ether, and diethylene glycol dihexyl ether. Illustrative of the preferred class of phenolic compounds suitable for the practice of this invention are such phenols as phenol, 3,5-dimethoxy phenol, cresol, and o-phenyl phenol.

Especially preferred compounds for use as extracting agents according to this invention are 1,4-dioxane, diethylene glycol dimethyl ether, the monomethyl ether of diethylene glycol and cresol. This is because these compounds are very effective in increasing the relative volatility of 1,1,1-trichloroethane in chlorohydrocarbon mixtures, are very soluble in chlorohydrocarbons in all proportions, form compositions which are easily handled and are readily procured in marketable quantities at relatively low cost.

In a preferred mode of operation the extracting agent is continuously added to the 1,1,1-trichloroethane-chlorohydrocarbon mixture contained within a zone and a 1,1,1-trichloroethane enriched product is continuously distilled from the upper portion of the zone while a residue is continuously withdrawn from the lower portion of the zone. This technique is particularly applicable to the separation of 1,1,1-trichloroethane from 1,2-dichloroethane or for separation of 1,1,1-trichloroethane from other chlorinated hydrocarbons, such as for the separation of 1,1,1-trichloroethane from reaction mixtures resultant in the manufacture of 1,1,1-trichloroethane by co-chlorination of ethyl chloride eand 1,1-dichloroethane.

The following examples and demonstrations will bring out further embodiments and will serve to further clarify the principle of the invention and its operation. All proportions are in mole percent except as otherwise specified.

In Table I below is shown data demonstrating the relative volatility of the 1,1,1-trichloroethane (1,1,1-EtCl$_3$) in regard to 1,2-dichloroethane (1,2-EtCl$_2$) when the 1,1,1-trichloroethane and 1,2-dichloroethane are provided in the liquid phase at different concentrations. This data was obtained by providing the two chlorinated hydrocarbon compounds one dissolved within the other at varying concentrations within a distillation column operated at total reflux. A single stage insulated still was operated for one hour to assure a state of equilibrium between liquid and vapor at the time the data was taken. Thus, the first two columns of figures show the molar composition of the vapor under equilibrium conditions when the molar composition of the liquid is as shown in the next two columns of figures. The relative volatility of the 1,1,1-trichloroethane with regard to the 1,2-dichloroethane is as shown in the fifth column. Examination of this data shows that as the concentration of the 1,1,1-trichloroethane within the liquid increases the relative volatility of the 1,1,1-trichloroethane rapidly decreases. The significance of this data is that the 1,1,1-trichloroethane cannot be obtained from this mixture in high concentrations by distillation without employing an impractical number of distillation trays.

TABLE I

*Data Showing the Rapidly Decreasing Relative Volatility of 1,1,1-Trichloroethane as Its Concentration Within a 1,1,1-Trichloroethane-1,2-Dichloroethane Mixture Increases*

| Vapor Composition, Mole Percent | | Liquid Composition, Mole Percent | | Relative Volatility |
|---|---|---|---|---|
| 1,1,1-EtCl$_3$ | 1,2-EtCl$_2$ | 1,1,1-EtCl$_3$ | 1,2-EtCl$_2$ | 1,1,1-EtCl$_3$ to 1,2-EtCl$_2$ |
| 7.62 | 92.40 | 4.73 | 95.25 | 1.680 |
| 14.80 | 85.20 | 9.81 | 90.19 | 1.595 |
| 26.75 | 73.25 | 19.19 | 79.75 | 1.515 |
| 55.60 | 44.40 | 48.75 | 51.25 | 1.315 |
| 80.60 | 19.40 | 76.80 | 23.20 | 1.254 |
| 89.00 | 11.30 | 87.10 | 12.92 | 1.197 |

The table above thus shows that as the concentration of 1,1,1-trichloroethane within the mixture increases, the relative volatility of the 1,1,1-trichloroethane decreases. The effect of this is that while the concentration of the 1,1,1-trichloroethane within the mixture is quite low, the relative volatility of the 1,1,1-trichloroethane is reasonably high; but as the concentration of the 1,1,1-trichloroethane increases the relative volatility of this compound within the mixture decreases. The practical effect of this phenomenon is that it is commercially unfeasible to remove the 1,1,1-trichloroethane from this mixture by distillation inasmuch as as high as 150 distillation trays would be required to obtain a 1,1,1-trichloroethane purity of as high as 99 weight percent.

Sharply contrasted to the above however is the following representative data of Table II showing that the relative volatility of the 1,1,1-trichloroethane within the 1,1,1-trichloroethane-1,2-dichloroethane mixture increases when select extracting agents are provided in this mixture pursuant to the practice of the present invention.

TABLE II

*Data Illustrating the Sharp Increase in Relative Volatility of 1,1,1-Trichloroethane Within a 1,1,1-Trichloroethane-1,2-Dichloroethane Mixture Pursuant to Present Invention*

| Example | Extractant | Vapor Composition, Mole Percent | | | Liquid Composition, Mole Percent | | | Relative Volatility |
|---|---|---|---|---|---|---|---|---|
| | | 1,1,1-EtCl$_3$ | 1,2-EtCl$_2$ | Extractant | 1,1,1-EtCl$_3$ | 1,2-EtCl$_2$ | Extractant | 1,1,1-EtCl$_3$ to 1,2-EtCl$_2$ |
| I | Diethylene glycol monomethyl ether. | 68.00 | 21.22 | 10.78 | 13.44 | 7.49 | 79.07 | 1.785 |
| II | 1,4-Dioxane | 24.55 | 17.05 | 58.40 | 12.98 | 14.49 | 72.53 | 1.607 |
| III | Diethylene glycol dimethyl ether. | 37.20 | 31.50 | 31.30 | 8.28 | 11.02 | 80.30 | 1.570 |
| IV | Cresol | 52.45 | 38.15 | 7.40 | 11.23 | 11.97 | 76.80 | 1.462 |

It will thus be readily observed that the foregoing series of data shows that the relative volatility of the 1,1,1-trichloroethane to the 1,2-dichloroethane is readily increased by addition of the extracting agent to the 1,1,1-trichloroethane-1,2-dichloroethane mixture thus making it possible to separate 1,1,1-trichloroethane from the mixture by distillation in practical and economical manner. A further advantage of applicants' unique extracting agents is that the extracting agents themselves are easily removed from the residual mixture in a separate column or even in the same column by addition of a few extra trays thereto.

Examples I–IV of Table II thus show relative volatility data for 1,4-dioxane, the monomethyl and dimethyl ethers of diethylene glycol and for cresol. The data was obtained at boiling conditions at atmospheric pressure. The second column identifies the extracting agent employed and the following two columns of three rows of figures each the composition of the vapor and the liquid in mole percent. From the data given in the last column at the right it is observed that the relative volatility of 1,1,1-trichloroethane to the 1,2-dichloroethane is quite high even though the amount of 1,2-dichloroethane in the liquid composition is quite high with regard to the 1,1,1-trichloroethane contained therein. This shows that 1,1,1-trichloroethane of high purity can be separated from the 1,2-dichloroethane without using an excessive number of distillation trays.

The following example demonstrates in a very practical manner a typical distillation for the separation of 1,1,1-trichloroethane from a mixture of chlorinated hydrocarbons resultant from the co-chlorination of ethyl chloride and 1,1-dichloroethane.

*Example V.*—100 parts by weight per hour of a chlorohydrocarbon mixture containing 90 parts by weight 1,1,1-trichloroethane and 10 parts by weight 1,2-dichloroethane is continuously fed at the thirtieth uppermost plate into a distillation column having 62 bubble trays. 100 parts by weight per hour, of 1,4-dioxane is continuously fed at the fifth uppermost tray of the distillation column. The liquid within the column is maintained at boiling conditions, and at atmospheric pressure. From the top of the distillation column is evolved a vapor product consisting of over 99 weight percent 1,1,1-trichloroethane. The product is condensed and 90 parts by weight per hour sent to storage. The reflux ratio is maintained at 2:1. Sufficient 1,4-dioxane remains within the 1,1,1-trichloroethane to stabilize the composition against metal induced decomposition. From the bottom of the column is removed a composition consisting of 94 mole percent 1,4-dioxane and 6 mole percent 1,2-dichloroethane and traces of other chlorinated hydrocarbons. This composition is fed into a second distillation column having five trays and the 1,2-dichloroethane removed from the top of the column. 1,4-dioxane is fed back into the first distillation column.

When the foregoing is repeated except that 3-methyl-1,4-dioxane, 4-methyl-1,3-dioxane, and 2-tert-butyl-1,3-dioxane are employed as extracting agents, again very excellent results are obtained.

On the other hand, when the above example is repeated in all details except that no extracting agent is used, 150 distillation trays are required to provide a 1,1,1-trichloroethane product of the same purity.

*Example VI.*—When separating a mixture of 1,1,1-trichloroethane-1,2-dichloroethane similar to that given in the above example under the conditions of Example V but using diethylene glycol dimethyl ether as the extracting agent, only 30 distillation trays are required to obtain a 1,1,1-trichloroethane product of 99 weight percent purity. A column having five additional distillation trays are required to separate the ether from the mixture obtained from the bottom of the still.

When the run is repeated using the monobutyl, the monooctyl and the monodecyl ethers of diethylene glycol, excellent results are again obtained in regard to the number of distillation trays required to effect a clean separation of 1,1,1-trichloroethane.

*Example VII.*—When repeating Example V in all details except that the extracting agent employed is diethylene glycol dimethyl ether, it is found that 67 distillation trays are required in the column to provide a 1,1,1-trichloroethane product of 99 weight percent purity. Five additional trays are required to separate the extracting agent from the 1,2-dichloroethane.

When the dibutyl ether, the propyl butyl ether, and the diamyl ether of diethylene glycol are employed as extracting agents under the same conditions, a high purity 1,1,1-trichloroethane product is obtained.

*Example VIII.*—In repeating Example V in all details except that cresol is employed as the extracting agent, a total of 67 distillation trays are required in the column to provide a 1,1,1-trichloroethane product of 99 weight percent purity. Five additional trays are required to separate the extracting agent from the composition from the bottom of the still.

When the run is repeated employing o-cresol, m-cresol, 2-naphthol acetate, 1-chloro-2-naphthol, p-amoxy phenol, and p-anilino phenol substituted for cresol as the extracting agent, 1,1,1-trichloroethane is again obtained in high purity.

As heretofore stated, a feature of this invention is that the 1,1,1-trichloroethane compositions obtained are provided with a small amount of an extracting agent which effectively stabilizes the 1,1,1-trichloroethane against metal induced decomposition. Thus, the compositions can be placed in metal storage tanks, metal containers, tank cars and the like for long periods of time without solvent decomposition. Further, the distillation column itself is protected against corrosion.

In most embodiments the extracting agent is added to the chlorohydrocarbon mixture from which 1,1,1-trichloroethane is to be separated to form residual compositions with the compound, or compounds, from which the 1,1,1-trichloroethane is to be separated. These consist essentially of from about 10 to about 95 mole percent of the extracting agent. It is generally preferable however to form such residual compositions containing essentially from about 40 to about 85 mole percent of the extracting agent.

Having described the invention what is claimed is:

1. A method of recovering 1,1,1-trichloroethane from a mixture consisting essentially of 1,1,1-trichloroethane and a compound selected from the group consisting of ethyl chloride, 1,1-dichloroethane and 1,2-dichloroehtane comprising adding an extracting agent, hereinafter defined, to the mixture from which the 1,1,1-trichloroethane is to be separated, distilling the mixture to evolve a 1,1,1-trichloroethane enriched vapor therefrom, then condensing and recovering the vapor; the extracting agent being selected from the group of compounds consisting of ethers and phenolic compounds, said ethers being glycolic ethers characterized by containing from 4 to about 16 carbon atoms within the molecule and said phenolic compounds being characterized in that they are monohydric compounds containing up to 3 alkyl substituents having from 1 to about 5 carbon atoms but provided that the total number of carbon atoms in the molecule does not exceed 12.

2. The process of claim 1 wherein the ethers are further characterized as having a melting point of not greater than about 70° C. and a boiling point at atmospheric pressure of at least about 75° C.

3. The process of claim 2 wherein the ethers are selected from a group of compounds consisting of 1,4-dioxane, diethylene glycol dimethyl ether and the monomethyl ether of diethylene glycol.

4. The process of claim 1 wherein the phenolic compounds are further characterized as having a melting point of not greater than about 70° C. and a boiling point at atmospheric pressure of at least about 75° C.

5. The process of claim 4 wherein the phenolic compound is cresol.

6. A method of recovering 1,1,1-trichloroethane from a mixture consisting essentially of 1,1,1-trichloroethane and 1,2-dichloroethane comprising adding cresol to the mixture from which 1,1,1-trichloroethane is to be separated, distilling the mixture to evolve 1,1,1-trichloroethane in enriched vapor therefrom, and then condensing and recovering the vapor.

References Cited in the file of this patent

UNITED STATES PATENTS 3,012,081    Conrad et al. _____ Dec. 5, 1961